Nov. 29, 1955  H. W. DODDS ET AL  2,725,288
PROCESS AND APPARATUS FOR FABRICATING METALLIC ARTICLES
Filed Aug. 26, 1952  3 Sheets-Sheet 1

INVENTORS
Harry W. Dodds
Charles B. Sawyer
BY
Roland A. Anderson
Attorney

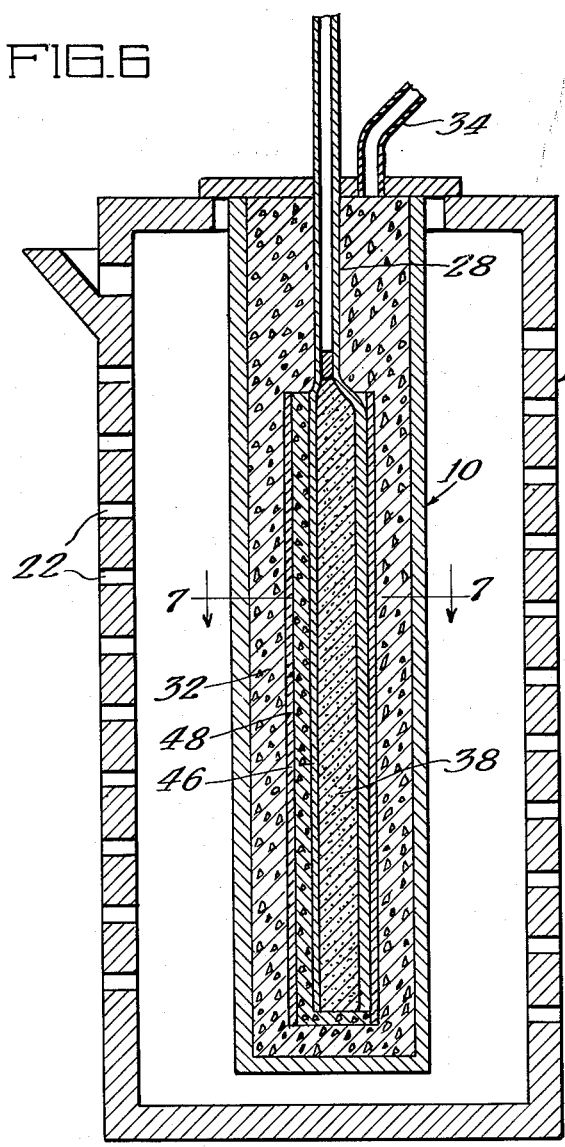
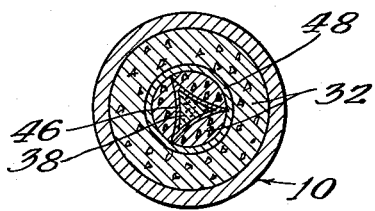
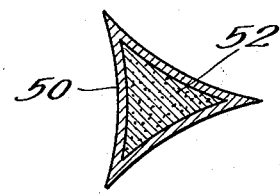

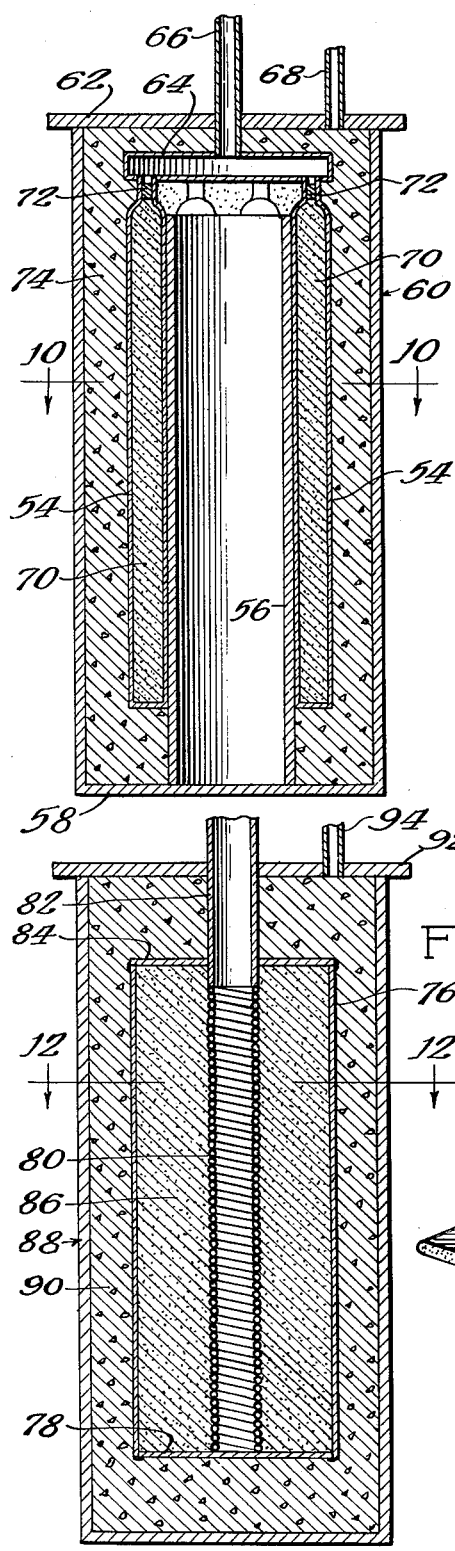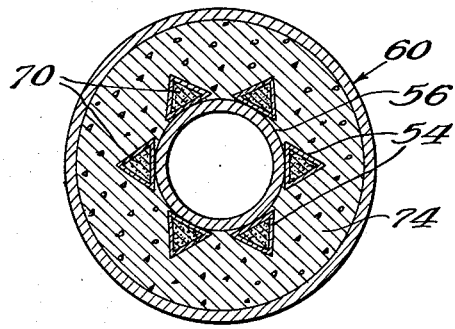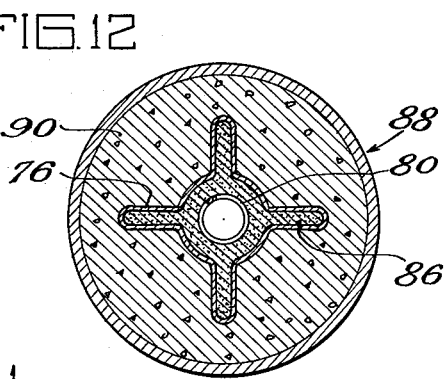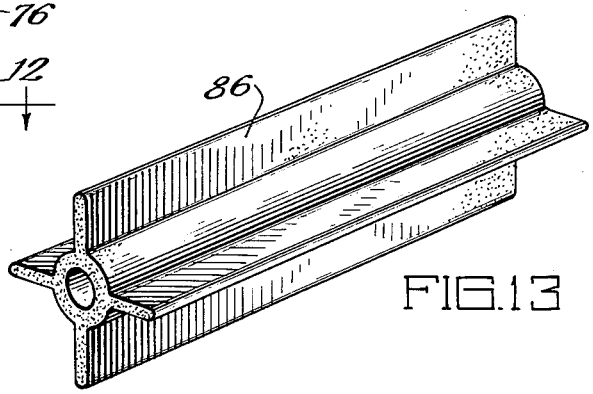

United States Patent Office 2,725,288
Patented Nov. 29, 1955

2,725,288

PROCESS AND APPARATUS FOR FABRICATING METALLIC ARTICLES

Harry W. Dodds, Bay Village, and Charles B. Sawyer, Cleveland Heights, Ohio, assignors, by mesne assignments, to the United States of America as represented by the United States Atomic Energy Commission Application August 26, 1952, Serial No. 306,344

19 Claims. (Cl. 75—226)

This invention relates to the fabrication of articles by a powder metallurgical process, and more particularly to a method and apparatus for fabricating articles from powdered beryllium or other metals having similar characteristics.

This invention has as an object the fabrication of articles from metals that do not lend themselves well to drawing or extrusion. A further object of this invention is to sinter an elongated article while applying substantially uniformly distributed radially compressive forces to such article throughout the length thereof. A still further object of this invention is to provide a method and apparatus to simultaneously compact and sinter a metallic powder to form elongated solid stock of desired cross section, or elongated tubular stock either with or without external longitudinally extending fins. Yet another object of this invention is to prevent distortion of the longitudinal axis of the article produced during the sintering thereof. Other objects will appear hereinafter.

These objects are accomplished by the following invention that comprises generally the application of fluid pressure to the exterior of a flexible envelope containing powdered metal while such metal is subjected to a sintering temperature. Other refinements of the invention include maintaining a high vacuum within the envelope and subjecting the envelope to such mechanical restraint as to prevent distortion of the envelope other than the desired contraction thereof produced by the fluid pressure for compaction of the powdered metal. It is, of course, an essential element of the invention that the envelope be of a material possessing the necessary flexibility while being capable of withstanding the sintering temperature of the metallic powder undergoing treatment. In order to avoid objectional deterioration of the envelope at the temperatures involved in the process, the fluid utilized to exert pressure on the envelope is preferably chemically inert thereto and gaseous for ease in handling.

A fuller appreciation of the method of this invention and the apparatus employed in the practice of the same will be had upon reference to the accompanying drawings, wherein:

Fig. 4 is an enlarged transverse sectional view of an alternate form of the envelope shown in Figs. 1 and 2, such alternate form being adapted to produce an article readily machinable to a round cylinder;

Fig. 5 is a transverse sectional view of an article produced in the form of envelope shown in Fig. 4;

Fig. 6 is a central vertical sectional view of a modified form of the invention shown in Fig. 1, this form of the invention being adapted to produce tri-fluted elongated articles;

Fig. 7 is a horizontal sectional view taken upon the plane of the section line 7—7 in Fig. 6;

Fig. 8 is an enlarged transverse sectional view of an article produced by the apparatus of Figs. 6 and 7 prior to removal of the envelope therefrom;

Fig. 9 is a central vertical sectional view of another modification of the invention adapted to produce a plurality of tri-fluted elongated articles simultaneously;

Fig. 10 is a horizontal sectional view taken upon the plane of the section line 10—10 of Fig. 9;

Fig. 11 is a central vertical sectional view of still another modification of the invention adapted to produce an elongated tubular article having longitudinally extending external fins thereon;

Fig. 12 is an enlarged horizontal sectional view taken upon the plane of the section line 12—12 in Fig. 11; and, Fig. 13 is an enlarged perspective view of an article produced by the apparatus of Figs. 11 and 12 after machining.

Figure 1:
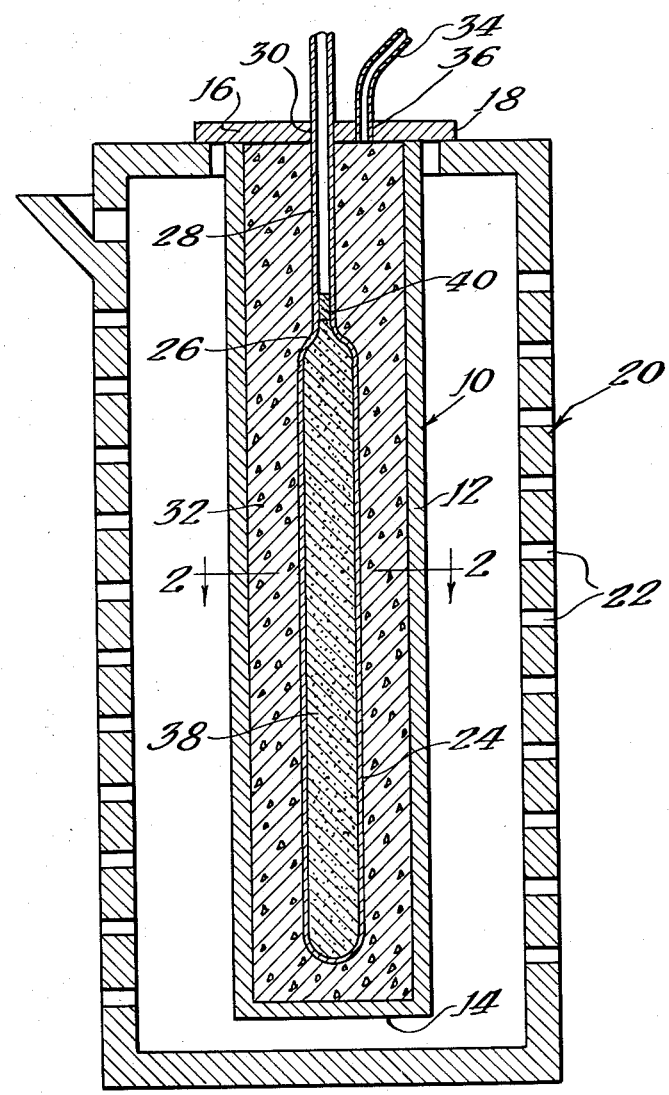
Fig. 1 is a central vertical sectional view of one form of the invention with a vacuum apparatus and portions of the furnace removed.
Figure 2:
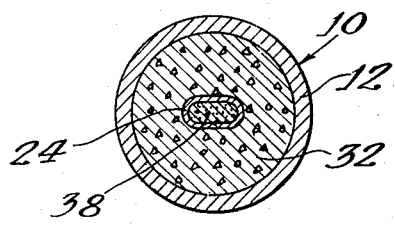
Fig. 2 is a horizontal sectional view taken upon the plane of the section line 2—2 of Fig. 1.
Figure 3:
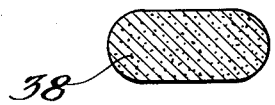
Fig. 3 is an enlarged transverse sectional view of an article produced by the apparatus shown in Figs. 1 and 2.

Reference is now made more specifically to the drawings, wherein like numerals designate similar parts throughout the drawings; attention being first directed to Figs. 1 through 3, wherein the reference number 10 designates generally a steel pressure vessel formed of a vertical cylinder 12 closed at its lower end by an integral end wall 14.

The upper end of the cylinder 12 is closed by a closure disk 16, such disk 16 being suitably welded or otherwise secured to the cylinder 12 to form a removable gas-tight closure therefor. The disk 16 projects radially from the cylinder 12 to constitute a supporting flange 18 for the pressure vessel 10.

The vessel 10 is heated by a gas-fired furnace 20 having burner ports 22, the vessel 10 being received through the open upper end of the furnace 20 with the flange forming portion 18 of the closure disk 16 resting upon the top of the furnace, as clearly shown in Fig. 1.

An elongated flexible metal container or envelope 24 is disposed in the vessel 10 in spaced relation to the walls of the vessel 10, such envelope being closed at its lower end, and having its open upper end reduced in diameter, as at 26, and secured to an upstanding tube 28. The tube 28 projects upwardly through an opening 30 in the disk 16 in gas-tight relation thereto.

The space within the vessel 10 surrounding the envelope 24 and the tube 28 is packed with 60 mesh silicon carbide 32 to facilitate heat transfer from the walls of the vessel 10 to the envelope 24 and to prevent distortion of the envelope 24 during the application of heat and external pressure thereto in a manner to be presently set forth. A pipe 34 is welded into an opening 36 provided in the disk 16, whereby fluid may be introduced into the space occupied by the silicon carbide 32.

In the use of the apparatus shown in Figure 1, the envelope 24, which is made from round seamless steel tubing having thin wall thickness, is compactly filled with 200 mesh beryllium powder 38 by resting the lower end of the envelope on a Syntron vibrator, not shown, and tapping the side of the envelope 24 while introducing the beryllium powder 38 into the envelope 24 through the tube 28, after which a graphite filter 40 is positioned in the tube 28 above the beryllium 38.

As mentioned previously, the envelope 24 has a thin wall thickness, $\frac{1}{16}$ of an inch having been found satisfactory. In order that the sintered beryllium will have such a shape as to be readily machinable to a long rectangular bar, the beryllium filled envelope 24 is then flattened to a generally elliptical cross section, as shown in Fig. 2, in a hydraulic press, not shown. In practicing the invention, it has been found that using an envelope 24 initially of 2 inch outside diameter and flattening the envelope to a thickness of 1⅜ inches produces flats on opposite sides of the envelope about 1¾ inches wide and eventually results in a sintered product having the cross section shown in Fig. 3, that may be machined readily to a rectangular cross section.

After the envelope 24 has been flattened as described above, the envelope 24 is placed in the vessel 10, and the space surrounding the same is packed with the silicon carbide 32 before the disk 16 is welded or otherwise secured to the cylinder.

The tube 23 is then connected to a vacuum pump, not shown, and the interior of the envelope is exhausted to a pressure of about 50 microns to remove residual oxygen and nitrogen and to provide for the removal of any volatile impurities present in the powdered metal. Argon is introduced into the space occupied by the silicon carbide 32 through pipe 34 until a pressure of about 300 pounds per square inch is obtained. If desired, oxygen and nitrogen may be exhausted from the space by connecting the pipe 34 to a vacuum pump prior to the introduction of argon thereinto. However, such a step is optional. The aforementioned pressure within the envelope 24 and the argon gas pressure are maintained throughout the heat treatment now to be described.

The outside of the vessel 10 is then slowly heated by the furnace 20 to a temperature of 1060° C. which results in a somewhat lower temperature of the envelope 24 of about 1050° C. The envelope 24 is maintained at the last mentioned temperature for about 12 hours, after which the furnace 20 is turned off and allowed to cool.

When the furnace is cool, the envelope 24 is removed from the remaining apparatus, and is stripped from the sintered beryllium therein. The sintered beryllium has the shape of an elongated, substantially rectangular bar having rounded edges, the compression during heating having forced the flat surfaces closer together without reducing the thickness of the edges very much. The sintered beryllium product has a density of about 1.86 grams per cubic centimeter, and using an envelope 24 of the aforementioned dimensions has a cross section of about ½ inch by 2 inches.

In order to produce a sintered product well adapted to be machined into long round bars, an envelope of modified form is used. Such a modified envelope 42 is shown in transverse section in Figure 4. As will be apparent, the envelope 42 is of a round corrugated shape in transverse section, the same being preferably formed of 0.017" mild steel. The apparatus used in the production of round bars differs from that shown in Figure 1 only by the substitution of an envelope 42, having the transverse section shown in Figure 4, for the envelope 24 shown in Figure 1.

The method for producing long round bars comprises filling the envelope 42 by resting the same on a Syntron vibrator while introducing 200 mesh beryllium powder through the tube 28 and tapping the side of the envelope 42. The graphite filter 40 is then positioned in the tube 28, and the apparatus assembled as shown in Figure 1 substituting the envelope 42 for the envelope 24.

The envelope 42 is exhausted through the tube 28 to a pressure of about 50–150 microns, and argon gas is introduced into the space occupied by the silicon carbide 32 to obtain a pressure of about 300 pounds per square inch. Such pressures are maintained throughout the period of heating the vessel 10. The heat treatment comprises slowly heating the vessel 10 until the envelope is at a temperature of about 1050° C., and then maintaining such temperature for about 12 hours after which the furnace 20 is turned off and allowed to cool.

After the apparatus has cooled, the envelope 42 is removed and stripped from the sintered product shown at 44 in Figure 5. The sintered beryllium 44 is elongated and generally round in shape, and may be readily machined to produce an elongated smooth round bar of beryllium.

While the silicon carbide tends to prevent distortion of the envelope 42 about its longitudinal axis during the compression and heating, further precautions against such distortion may take the form of securing a weight, not shown, to the lower end of the envelope 42. The tension in the envelope 42 produced by a weight suspended from its lower end, when such weight is of the order of about one pound per pound of beryllium contained in the envelope 42, tends to keep the envelope 42 straight.

Attention is now directed to Figures 6 through 8, wherein still another form of envelope is shown, this form of the invention being suited to the production of fluted bars of beryllium. The envelope 46, like envelope 42, is fabricated from 0.017" mild steel, and differs from envelope 42 only in that it is in the shape of an equilateral triangle in transverse section (see Figure 7) rather than having a corrugated shape. In addition, a close fitting, open ended steel tube 48 surrounds the envelope 46, as clearly shown in Figure 7. The tube 48 is provided to prevent distortion of the envelope 46 during sintering, it being noted that the space intervening between the tube 48 and the envelope 46 is filled with silicon carbide to facilitate heat transfer to the envelope 46.

As in the previously described methods for producing elongated rectangular and round bars of beryllium, the envelope 46 is filled with powdered beryllium, the filter 40 is positioned, the interior of the envelope is exhausted to a pressure of about 50–150 microns, and argon is introduced through the pipe 34 at a pressure of about 300 pounds per square inch. Such pressures are maintained during the heat treatment. The heat treatment comprises slowly heating the envelope 46 to a temperature of about 1050° C. by the furnace 20, and maintaining such temperature for a period of about five hours, after which the furnace 20 is turned off and allowed to cool. The envelope 46 is then removed from the tube 48 and stripped from the sintered product.

As a result of the compression and heating of the envelope 46 and its contents, the sides of the envelope 46 will be, as indicated at 50, concaved and the sintered beryllium product therein will be in the shape of an elongated trifluted bar 52 as shown in Figure 8.

In producing trifluted shapes, experiment has shown that the volume of beryllium powder required may be lessened by preforming the concave sides of the filled envelope 46 by mechanical pressure. A maximum pressure of 10 tons per square inch is sufficient for this purpose. The contents of the envelope 46 may then be sintered in the same manner as though the envelope had not been preformed.

Figures 9 and 10 illustrate apparatus for simultaneously sintering a plurality of trifluted shapes. In this form of the invention, a plurality of envelopes 54, six being shown, each of which is similar to the envelope 46 described in connection with Figures 6 and 7, are clustered about a central steel tube 56. The lower end of the tube 56 rests upon the bottom 58 of a steel pressure vessel 60.

Although each of the envelopes 54 may be provided with a separate vacuum tube to extend through the closure disk 62 of the vessel 60, the preferred construction comprises a steel manifold 64 within the vessel 60 having communication through the disk 62 by means of a tube 66. The upper ends of the envelopes 54 are necked down and welded in openings provided therefor in the manifold 64, the arrangement being such that the envelopes may be exhausted through the single tube 66. As in the previous forms of the invention, a pipe 68 communicates with the interior of the vessel 60 through the disk 62.

In using the apparatus shown in Figures 9 and 10, each of the envelopes 54 is packed with powdered beryllium 70, and a graphite filter 72 is fitted in its upper end, after which the reduced upper end is welded vacuum-tight to the manifold 64. The apparatus is then assembled as shown in Fig. 9 with 60 mesh silicon carbide 74 packed about the clustered envelopes 54, and the disk 62 is welded to the rest of the vessel 60.

A vacuum pump is connected to the tube 66 and argon is admitted to the vessel 60 through the pipe 68. A pressure of about 50–150 microns within the envelopes 54 and an argon gas pressure of about 300 pounds per square inch are maintained during the heat treatment. Such heat treatment comprises placing the vessel 60 in a furnace such as that shown at 20 in Fig. 1 and slowly heating the vessel 60 until the envelopes are at a temperature of about 1050° C. This temperature is maintained for a period of about 5 hours after which the application of heat is discontinued and the vessel 60 and its contents allowed to cool. The envelopes 54 are then removed and stripped from the sintered product therein.

In each of the hereinbefore described heat treatments, it is not necessary that the beryllium being treated be maintained under vacuum during the cooling period, that is, after the furnace has been turned off. Such vacuum may be maintained until the beryllium has cooled and before the envelope is disassembled, or if desired, the vacuum may be broken at the beginning of the cooling period by admitting argon gas into the envelope at atmospheric pressure. Similarly, argon pressure may be maintained in the pressure vessel until the pressure vessel is to be opened and after the beryllium has cooled; however, if desired, the argon gas pressure may be reduced to atmospheric pressure at the beginning of the cooling period.

Figures 11 and 12 illustrate apparatus for sintering tubular beryllium shapes. In this form of the invention, an envelope 76 is provided having the general configuration of the desired external shape of the product. For example, if round tubing is desired, an envelope of the character of that shown at 42 in Figure 4 would be provided. The illustrated envelope 76, however, is designed to produce an elongated beryllium shape having longitudinally extending radial fins thereon.

The envelope 76 is formed of steel, preferably of a wall thickness of about 0.012" to 0.020"; and may be formed to the desired contour by breaking a sheet of steel of the length desired for the product, bringing the edges together and welding longitudinally at the tip of one of the fins, or it may be rolled from two strips each forming one-half of the envelope, the two halves being welded at the tips of two opposite fins.

The lower end of the envelope 76 is closed by a steel plate 78 that is welded thereto, the plate 78 having a periphery corresponding to the contour of the envelope 76. A core member 80 is provided for defining an opening through the desired tubular product. The core member 80 comprises a tightly wound helix of steel. A helix formed of either 3/16" or 1/4" strip steel has been found satisfactory for use as a core member of about one inch outside diameter. If desired, an even sturdier core structure may be formed of closely fitted inner and outer, oppositely wound helixes.

The core member 80 is disposed centrally of the envelope and is welded at its lower end to the plate 78, while the upper end thereof is welded to an upstanding tube 82 of about the same diameter as the core member 80. The upper end of the envelope is closed by a steel plate 84 welded thereto, and the plate 84 is welded to the tube 82 about a central opening therein through which the tube extends.

In assembling the above apparatus, the core member 80, the tube 82, and the envelope 76 are first secured to the plate 78 and then the envelope 76 is filled with beryllium powder. The beryllium powder 86 is compacted by imparting longitudinal vibrations to the welded assembly while 200 mesh beryllium powder is being fed into the top, a magnetic vibrator having been found to give satisfactory results. A light ramming action with a thin rod is also beneficial during the filling operation as this keeps the upper part of the powder agitated and dislodges any lumps that may have a tendency to stick to the envelope or the core member.

After the envelope 76 has been filled, the plate 84 is welded in place and the assembly is placed in a steel pressure vessel 88, and 60 mesh silicon carbide 90 is packed about the same before the closure disk 92 is welded on the vessel 88.

The disk 92 is provided with a pipe 94 communicating with the interior of the vessel 88. In addition, the tube 82 projects upwards through an opening in the disk 92 in sealing relation thereto.

After the apparatus has been assembled as shown in Fig. 11, the tube 82 is connected to a vacuum pump, not shown, and any air or gas entrapped in the beryllium powder 86 passes through the core member 80 and out the tube 82, the turns of the helix forming the core member being close enough to prevent beryllium powder passing therethrough while permitting the passage of gas therethrough. A pressure of about 20 to 50 microns is maintained in the beryllium powder 86. Argon is then introduced into the vessel 88 under pressure through the pipe 94.

The vessel 88 is placed in a furnace such as that indicated at 20 in Fig. 1, and the furnace controlled to slowly bring the temperature of the beryllium powder 86 up to about 1050° C., and this temperature is maintained for about ten to twelve hours. A thermocouple, not shown, may be placed in the core 80 to facilitate temperature control. The argon pressure in the vessel 88 is maintained at about 100–150 pounds per square inch throughout this heating period. Although gas pressures on up to 300 pounds per square inch would otherwise be desirable, it has been found that 150 pounds per square inch is a practical maximum because of the limitation brought about by the strength of the core member at 1050° C.

At the end of the ten to twelve hour heating period, the vacuum in the envelope 76 is released by introducing argon into the tube 82 and the pressure in the vessel 88 is released through the pipe 94, so that atmospheric pressure prevails both inside and outside of the envelope 76. The furnace is then controlled so that the temperature of the beryllium 86 is slowly reduced over a period of about seven hours from about 1050° C. to room temperature. The beryllium is cooled slowly, as too rapid cooling will produce cracks in the same.

The envelope 76 is then removed from the vessel 88 and the opposite end portions of the envelope are cut off thus leaving only the major central portion of the envelope 76 having the beryllium 86 and the core member 80 therein. The envelope 76 is stripped from the beryllium. A rod is then passed through the core member 80 and welded to one end of the core forming helix, after which the rod is rotated relative to the beryllium in such a manner as to wind the same up, such winding causing a reduction in the diameter of the core member 80 and permitting it to be easily withdrawn from the sintered beryllium.

In the above description the sintering of beryllium is carried out at a temperature of about 1050° C. This is the most advantageous sintering temperature, although beryllium may be sintered at temperatures ranging from 900° C. to 1200° C. Sintering temperatures of 1100–1150° C. are less desirable since an instantaneous grain growth takes place at these temperatures whereas the properties of beryllium are improved with fine grain. Above 1200° C. severe softening and incipient melting of impurity phases may occur. Below 900° C. little consolidation of beryllium particles takes place except at extremely high pressures. Temperatures below 900° C. are below the true sintering range for powdered beryllium. The beryllium powder used in the practice of this invention should be of high purity.

In the above description envelopes 24, 42, 46, 54, and 76 are said to be made of steel. However, various metals and alloys which are capable of withstanding the sintering temperatures and which exhibit flexibility at the sintering temperatures may be employed in lieu of steel as the envelope material. Nickel is a particularly good substitute, and if economic and atmospheric conditions permit, molybdenum and platinum envelopes may be used. The steel envelopes used in the practice of this invention are not only able to withstand sintering temperatures, but exhibit their greatest flexibility at elevated temperatures, a property manifestly desirable in the practice of this invention.

The use of argon as a compacting agent is preferred not only because of its chemical inertness, but also because of its good heat conducting properties and the ease with which a gas is handled. Other gases inert or substantially chemically inert with respect to steel at the sintering temperatures may obviously be used, such as helium, nitrogen, and hydrogen. As the sintering temperature of beryllium lies in the neighborhood of 1000° C., the use of most liquids as agents for applying radial pressure is not practical.

Materials other than silicon carbide may be used as a heat transferring and mechanical restraining material for the envelopes. Various comminuted refractory materials which are capable of withstanding the temperatures employed in the process, and which are substantially chemically inert with respect to the materials with which they come into contact may be employed in lieu thereof. As examples, silicon oxide, graphite, aluminum oxide, zirconium silicate, and the oxides or carbides of zirconium, beryllium, titanium may be used in place of silicon carbide.

The principal advantage of the present invention resides in the simultaneous sintering and applying of radial compression to powdered metal. The method may be applied to produce an elongated body of substantially uniform physical properties throughout its length, and without such density variations as are customarily encountered when such bodies are compacted by means of a die. In addition, the invention is applicable to the production of elongated bodies of a variety of more or less complex cross sections.

While the invention has been described above as a process of fabricating articles from powdered beryllium, the principles of the present invention are applicable to the fabrication of articles from powders of other refractory metals such as titanium, zirconium, hafnium, thorium, and uranium. When powders of these latter metals are to be sintered and consolidated, the pressures and periods of heating employed are similar to those set forth in the above description as being used in the fabrication of beryllium articles. For these other metals the upper and lower limits of their sintering ranges in degrees centigrade may be determined by multiplying their melting points in degrees centigrade respectively by 0.9 and by 0.7.

Resort may be had to such modifications and variations as fall within the spirit of the invention and the scope of the appended claims.

Having described our invention, we claim:

1. The method of simultaneously compressing and sintering a powdered refractory metal comprising the steps of confining the powdered refractory metal within a flexible envelope made from a metal selected from the group consisting of steel, nickel, molybdenum, and platinum, heating the powdered refractory metal to sintering temperature while so confined, and applying fluid pressure to the exterior of the flexible envelope by the use of an inert gas selected from the group consisting of argon, helium, nitrogen, and hydrogen while the powdered metal is at sintering temperature.

2. The method of simultaneously compressing and sintering an elongated mass of powdered refractory metal while the powdered refractory metal is subjected to radial compressive forces comprising the steps of confining the powdered refractory metal within an elongated flexible envelope made from a metal selected from the group consisting of steel, nickel, molybdenum, and platinum, restraining the flexible envelope against substantial distortion about its longitudinal axis, heating the powdered refractory metal to sintering temperature while so confined, and applying fluid pressure to the exterior of the flexible envelope by the use of an inert gas selected from the group consisting of argon, helium, nitrogen, and hydrogen while the powdered metal is at sintering temperature.

3. The method of simultaneously compressing and sintering a powdered refractory metal comprising the steps of confining the powdered refractory metal within a flexible metal envelope made from a metal selected from the group consisting of steel, nickel, molybdenum, and platinum, heating the powdered refractory metal to sintering temperature while maintaining a vacuum within the envelope, and applying fluid pressure to the exterior of the flexible envelope by the use of an inert gas selected from the group consisting of argon, helium, nitrogen, and hydrogen while the powdered metal is at sintering temperature.

4. The method of simultaneously compressing and sintering powdered beryllium comprising the steps of confining the powdered beryllium within a flexible steel envelope, heating the powdered beryllium to about 1050° C. while maintaining a pressure of less than about 150 microns within the envelope, and applying fluid pressure to the exterior of the envelope by the use of an inert gas selected from the group consisting of argon, helium, nitrogen and hydrogen while the beryllium is at the aforementioned temperature.

5. The method of simultaneously compressing and sintering a powdered refractory metal comprising the steps of confining the powdered refractory metal within a flexible metal envelope made from a metal selected from the group consisting of steel, nickel, molybdenum, and platinum, packing a comminuted refractory carbide or oxide about the envelope to restrain the latter against distortion, heating the powdered refractory metal to sintering temperature while maintaining a vacuum within the envelope, and applying fluid pressure to the exterior of the envelope by the use of an inert gas selected from the group consisting of argon, helium, nitrogen, and hydrogen while the comminuted refractory carbide or oxide is packed thereabout and while the powdered metal is at sintering temperature.

6. The method of simultaneously compressing and sintering powdered beryllium comprising the steps of confining the beryllium within a flexible steel envelope, packing comminuted silicon carbide about the envelope to restrain the latter against distortion, heating the beryllium to about 1050° C. while maintaining a pressure of less than 150 microns within the envelope, and applying gas pressure of more than 100 pounds per square inch to the exterior of the envelope by the use of an inert gas selected from the group consisting of argon, helium, nitrogen, and hydrogen while the silicon carbide is packed thereabout and while the beryllium is at a temperature of about 1050° C.

7. The method of fabricating elongated bodies of beryllium metal from powdered beryllium comprising the steps of confining powdered beryllium within an elongated, flexible steel envelope, heating the confined beryllium slowly to a temperature of about 1050° C. and maintaining such temperature for a period of at least 5 hours while maintaining a pressure of less than 150 microns within the envelope and applying a fluid pressure of at least 100 pounds per square inch to the exterior of the envelope by the use of an inert gas selected from the group consisting of argon, helium, nitrogen, and hydrogen, and then slowly cooling the beryllium.

8. In a method of fabricating a tubular body from powdered refractory metal, the steps of packing powdered refractory metal within an elongated, flexible steel envelope and around a central steel core member in the envelope, sintering the powdered refractory metal by heating the same to sintering temperature while maintaining a vacuum within the envelope and while also applying fluid pressure to the etxerior of the envelope by the use of an inert gas selected from the group consisting of argon, helium, nitrogen, and hydrogen, and subsequently cooling the sintered metal and removing the envelope and the core member therefrom.

9. In a method of fabricating a tubular body from powdered refractory metal, the steps of packing powdered refractory metal within an elongated, flexible steel envelope and around a central steel core member in the envelope, sintering the powdered refractory metal by heating the same to sintering temperature while maintaining a vacuum within the envelope and while also applying fluid pressure to the exterior of the envelope by the use of an inert gas selected from the group consisting of argon, helium, nitrogen, and hydrogen, restraining the envelope against distortion about its longitudinal axis during said sintering step, and subsequently cooling the sintered metal and removing the envelope and the core member therefrom.

10. Powder metallurgical apparatus comprising a pressure vessel, means for admitting a fluid under pressure to said pressure vessel, a flexible envelope made from a metal selected from the group consisting of steel, nickel, molybdenum, and platinum disposed within said pressure vessel, conduit means communicating between the interior of said envelope and the exterior of said pressure vessel for applying a vacuum to the interior of said envelope, and means for heating said pressure vessel and said envelope.

11. Powder metallurgical apparatus comprising a pressure vessel, means for admitting a fluid under pressure to said pressure vessel, a flexible envelope made from a metal selected from the group consisting of steel, nickel, molybdenum, and platinum disposed within said pressure vessel for holding powdered metal to be treated, conduit means communicating between the interior of said envelope and the exterior of said pressure vessel for applying a vacuum to the interior of said envelope, a refractory carbide or oxide in said pressure vessel packed about said envelope, and means for heating the powdered metal contained in said envelope.

12. The combination of claim 11, wherein said envelope comprises an elongated hollow cylinder having a closed end, said conduit means comprising a tube secured to the other end of the cylinder and extending outwardly from the vessel and in sealing engagement therewith.

13. The combination of claim 12, wherein the cylinder is generally elliptically shaped in transverse cross section.

14. The combination of claim 11, wherein said envelope comprises a thin walled, elongated hollow cylinder, such cylinder being generally round and having corrugations therein, said cylinder having a closed end, said conduit means comprising a tube secured to the other end of the cylinder and extending outwardly from the vessel and in sealing engagement therewith.

15. The combination of claim 11, wherein said envelope comprises an elongated, thin walled, hollow cylinder that is triangular in transverse cross section, said cylinder being closed at one end, said conduit means being secured to the other end of the cylinder.

16. The combination of claim 11, wherein said envelope comprises a plurality of elongated, thin walled, hollow cylinders each having a closed end, said conduit means including a manifold connected to the other end of said cylinders.

17. The combination of claim 11, wherein said envelope comprises an elongated, thin walled hollow cylinder having a core member therein, said cylinder being closed at one end and coupled to said conduit means at the other end.

18. Powder metallurgical apparatus comprising a pressure vessel, means for admitting a fluid under pressure to said pressure vessel, a flexible envelope made from a metal selected from the group consisting of steel, nickel, molybdenum, and platinum disposed within said pressure vessel for holding powdered metal to be treated, conduit means communicating between the interior of said envelope and the exterior of said pressure vessel for applying a vacuum to the interior of said envelope, a refractory carbide or oxide in the vessel packed about the envelope, and means for heating the contents of the envelope, said envelope comprising an elongated, thin walled cylinder having a closely wound helical core member therein, said cylinder being closed at one end and coupled to said conduit means at the other end.

19. The combination of claim 18, wherein said cylinder is round and has a plurality of radially extending fins thereon.

References Cited in the file of this patent

UNITED STATES PATENTS

| | | |
|---|---|---|
| 1,081,618 | Madden | Dec. 16, 1913 |
| 1,226,470 | Coolidge | May 15, 1917 |
| 2,220,018 | McKenna | Oct. 29, 1940 |
| 2,298,908 | Wentworth | Oct. 13, 1942 |